United States Patent [19]

Potts

[11] Patent Number: 4,504,025

[45] Date of Patent: Mar. 12, 1985

[54] APPARATUS FOR WINDING AN ENDLESS TAPE

[76] Inventor: Robert Potts, R.R. #2, P.O. Box 111, Urbana, Ill. 61801

[21] Appl. No.: 442,015

[22] Filed: Nov. 16, 1982

[51] Int. Cl.$^3$ ............................................. B65H 17/48
[52] U.S. Cl. ............................. 242/55.19 R; 352/128
[58] Field of Search ................ 242/55.19 R, 55.19 A, 242/55.18; 352/128; 360/93

[56] References Cited

U.S. PATENT DOCUMENTS

| | | | |
|---|---|---|---|
| 2,378,416 | 6/1945 | Like | 242/55.19 R |
| 3,823,890 | 7/1974 | Potts | 242/55.18 |
| 3,913,857 | 10/1975 | Threlkeld | 242/55.19 A |
| 4,015,790 | 4/1977 | Gelardi et al. | 242/55.19 A |
| 4,169,566 | 10/1979 | Boudouris et al. | 242/55.18 |
| 4,186,891 | 2/1980 | Johnson | 242/55.19 R |
| 4,208,018 | 6/1980 | Wilkinson | 242/55.19 R |

*Primary Examiner*—Billy S. Taylor
*Attorney, Agent, or Firm*—Balogh, Osann, Kramer, Dvorak, Genova & Traub

[57] ABSTRACT

A method and apparatus for loading a lengthy tape on a pair of turntables from a plurality of reels. The two turntables are appropriately supported adjacent to each other. The bottom of each turntable supports a large cam having a plurality of indentations defining a multi-lobed path over which a cam follower moves when the turntable is rotated. The cam follower is mounted on one arm of a bell crank of which the other arm supports a pusher member which applies an undulating force to the tape as it is being wound on the turntable. A sensing device is rotatably mounted in the center of each turntable and defines a take-off area for the tape being unwound from the center of the tape supported on the turntable. The sensing device controls a servo-motor which can rotate a half a turn in either direction to control an arm of a second bell crank which has the other arm supporting the first bell crank to shift the position of the first bell crank to thereby adjust the position of the pusher member with respect to the turntable. The surface of each turntable is provided with a plurality of radially extending friction strips and with film stripper rails which radiate outwardly and angularly. A synchronizer device equalizes the rate of the tape unwinding on one of the reels and the rate of the tape being unwound on the other reel. A shut-down control shuts down the operation of the apparatus whenever a break occurs in the tape along the path of its movement in either turntable area.

7 Claims, 3 Drawing Figures

APPARATUS FOR WINDING AN ENDLESS TAPE

BACKGROUND OF THE INVENTION

The invention relates generally to a method of loading tape from a plurality of reels on a single carrier and an apparatus for effecting and controlling the loading of the tape on a turntable on which the tape of a recorded program is wound, and more particularly in the loading and use of a pair of turntables for processing a tape having recorded thereon a lengthy program.

Generally, it has been practiced to take a tape of a recorded program, such as a movie, and load it on a turntable by winding it from the interior of the turntable outwardly and varying the length of the tape per revolution of the turntable directly with the radius of the winding. The inner end of the tape is led through appropriate apparatus for rendering the recorded program. The tape, after it passes through the appropriate apparatus, is then led back to the turntable and rewound from the center of a second turntable outwardly. After the program has ended, a take-up ring is removed from the second turntable and placed on the first turntable. Film is then pulled from the center of the second turntable through the use device back to the first turntable for take-up. Although this eliminates the need for rewind, rethreading is necessary.

One form of known apparatus for winding an endless tape is described in U.S. Pat. No. 4,208,018, wherein a program recorded on a tape is wound on a horizontally positioned turntable starting out from the inside of the turntable and outwardly to the outer periphery of the turntable. It is essential that the tape be wound in such manner that the length of the tape removed from the inside of the turntable, during the rendition of the program, be equal to the length of the tape which is returned back to the turntable for rewinding. To accomplish this, the known apparatus uses an arrangement for measuring the length of the removed tape so that it corresponds with the length of the tape being rewound on the turntable. In other words, a tape metering device is used in conjunction with other sensing devices which take up slack in the tape or relieve tension in the tape whenever it is being overstretched. The foregoing means are complex and do not necessarily guarantee that the winding and unwinding of the tape will occur without malfunctions. Furthermore, the known apparatus requires a superstructure above the turntable for supporting a plurality of pressure pads which are effective to define a corresponding plurality of scallops which are responsible for defining an undulating conformation of the wound tape. Since it is almost impossible to have a plurality of pressure pads which will exert uniform pressure on the tape which is being wound, discrepancies in the lengths of the wound tape will occur, creating problems in failure to obtain uniform tension throughout the wound tape. As a result, the symmetry of the desired scallops is not achieved.

SUMMARY OF THE INVENTION

To overcome the disadvantages of the prior art, means are provided on the turntable for supporting the wound tape on one of its edges and providing frictional support for the supported edge in such manner as to develop scallops without requiring the metering of the lengths of tape being wound on the turntable. Means are also provided for undulating the periphery of the wound tape which is supported entirely by gravity on its lower edge. The undulating motion is provided by a pusher arm actuated by an associated lever terminating in a cam follower which follows the path of a can secured below the turntable. The pusher arm is provided with a pair of pusher rollers which are angularly displaced with respect to each other to thereby provide a deeper layering of the tape on the turntable. The central portion of the turntable is provided with a sensor device which, in conjunction with a servo-motor, controls additionally, the depth of movement of the pusher arm. The sensor device responds to the tape being unwound from the inner portion of the turntable. In other words, if the rate of unwinding is too great in the inner portion of the turntable, the sensor device will send a signal to the servo-motor which will cause the pusher arm to move outwardly away from the center of the turntable to thereby allow the outer circumference to build up, thus winding more film per revolution. A synchronizer device is interposed between two turntables to control the rate of winding the tape in one of the turntables and the rate of unwinding of the tape from the other turntable. Means are provided on the surface of the turntable to facilitate the formation of undulations in the tape and also the removal of the innermost winding including means for upsetting the innermost winding to free it from adhesion with the remainder of the windings. A motor controller associated with linearly movable rollers transporting the tape is provided to shut down the operation of the apparatus whenever a break occurs anywhere along the path of tape movement.

The main object of the invention is to provide a method and apparatus for storing a tape representing a very lengthy recorded program on a pair of superposed turntables, with means being provided for automatic repeated presentation of the entire program.

Another object of the invention is to provide turntables for supporting and positioning a tape only on a single edge.

A further object of the invention is to provide means for forming free-formed non-uniform scalloped configurations in the tape as it is being wound on the turntable.

A still further object of the invention is to provide a pusher member for physically molding undulations in the tape being wound on the turntable.

A further object of the invention is to provide means for controlling the movement of the pusher member to correlate the rate of winding of the tape adjacent the periphery of the turntable with the rate of the unwinding of the tape in the interior of the turntable, making it unnecessary that the wound length be precisely the same as the unwound length, but rather that they maintain an average.

A still further object of the invention is to provide means for developing free-formed non-uniform scalloped configurations in the wound tape gravitationally supported on the turntable, the wound tape assuming an unrestrained scalloped configuration.

A still further object of the invention is to provide a synchronizing device which equalizes the rate of tape unwinding from one turntable with the rate of unwinding of the tape from the other turntable.

A further object of the invention is to provide controllers for shutting down the operation of the turntables when a break occurs somewhere along the path of tape movement.

These and other object and features of the invention will be apparent from the following description in conjunction with the accompanying drawings, wherein.

DESCRIPTION OF THE PREFERRED EMBODIMENT

Figure 1:
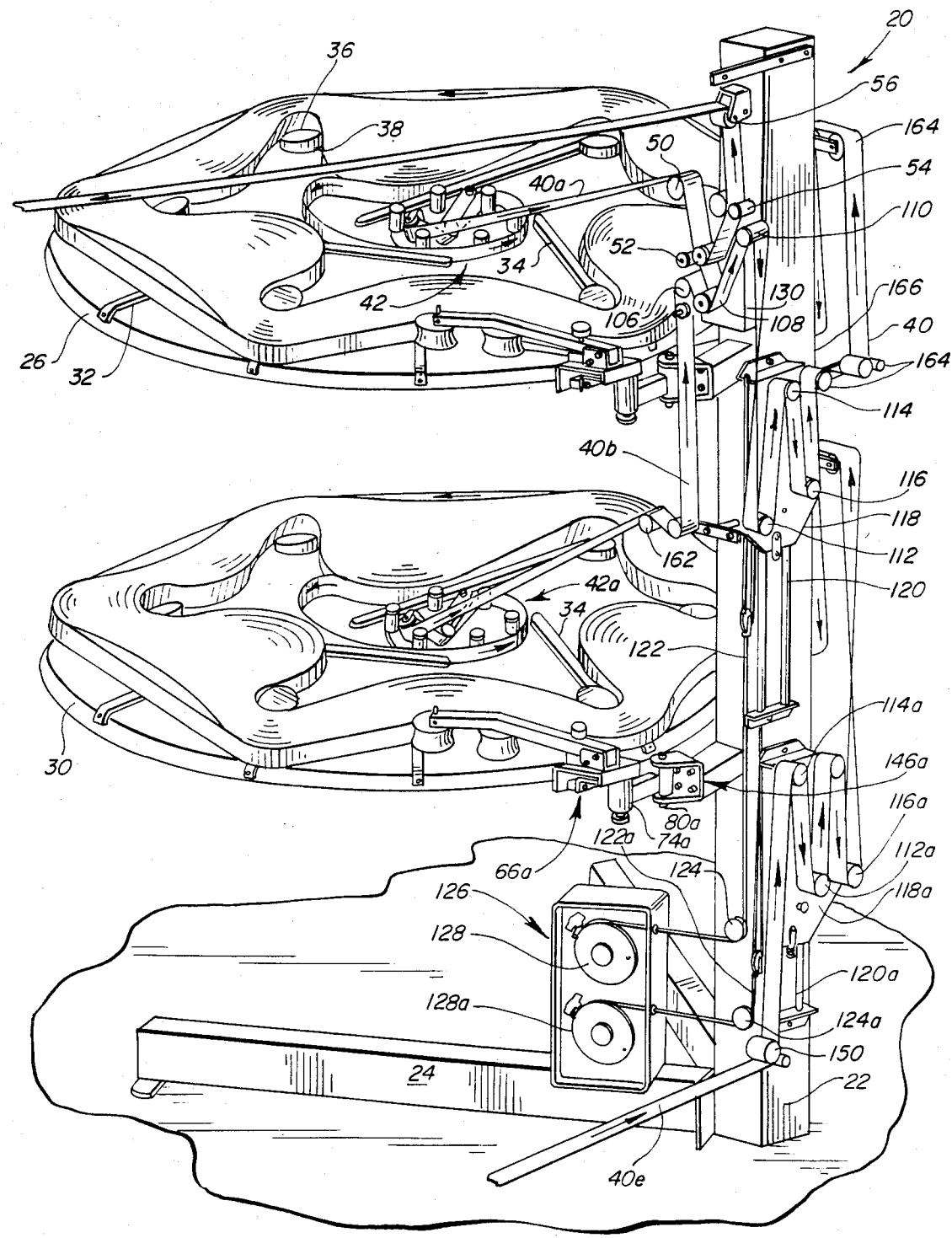
FIG. 1 is a perspective view of an apparatus for winding an endless tape having a lengthy recorded program, in accordance with the present invention.
Figure 2:
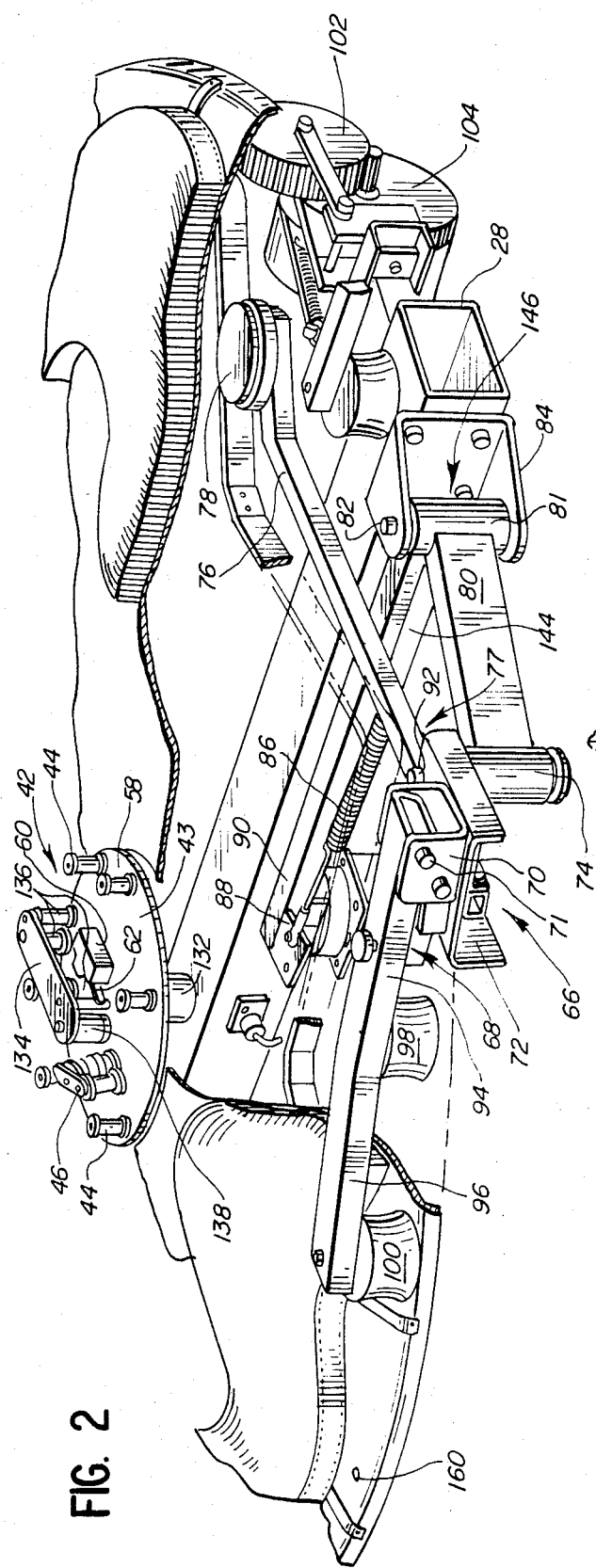
FIG. 2 is a perspective partial view of a turntable associated with a tape pusher assembly.
Figure 3:
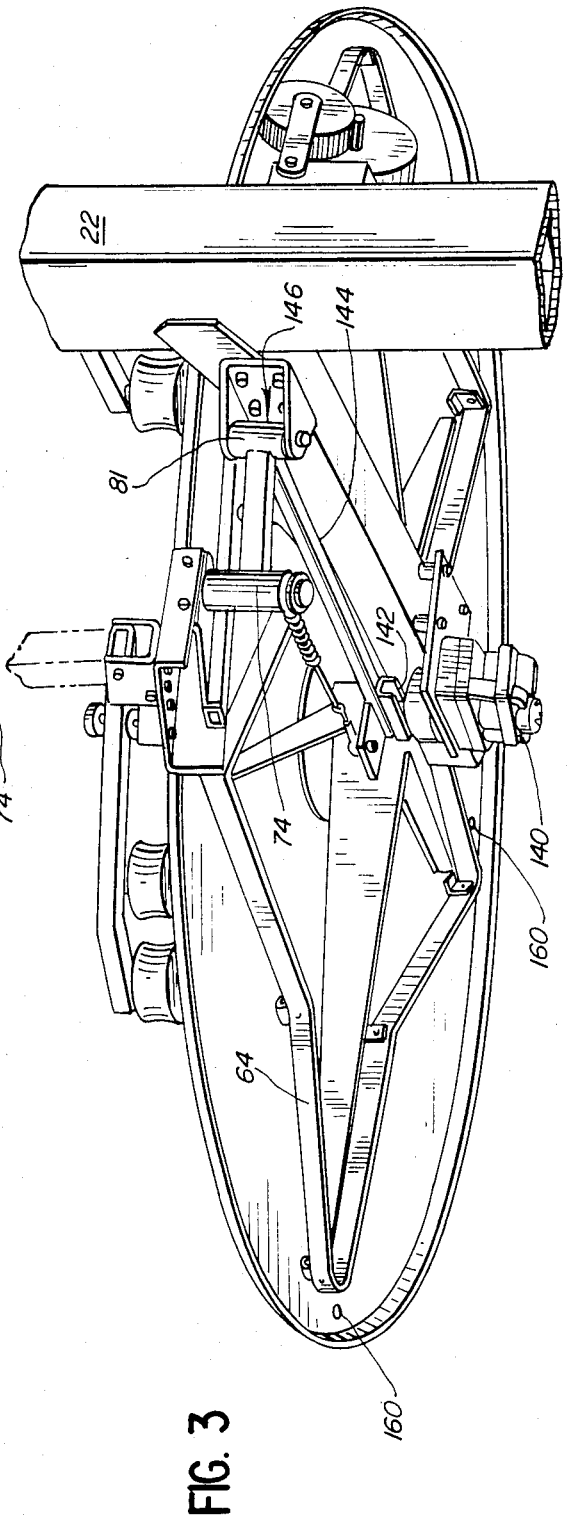
FIG. 3 is a perspective view of the bottom of the turntable supporting a cam arrangement.

The preferred embodiment of the invention is illustrated in FIGS. 1–3. Having particular reference to FIG. 1, an endless loop processing apparatus 20 comprises a vertical column 22 which is secured at its bottom end to a pair of horizontal foot members 24 angularly spaced from each other (only one foot member being shown for simplification purposes). An upper turntable 26 is supported by a support beam 28 having one end thereof secured by appropriate means such as welding to the vertical column 22.

A lower turntable 30 is similarly supported from the vertical column 22. Any description applied to the upper turntable 26 applies equally to the lower turntable 30.

As shown in FIG. 1, the turntable 26 has a plurality of friction strips 32 extending from the central portion of the turntable 26 to the outer periphery of the turntable, similar to spokes in a wheel. The turntable 26 is also provided with a plurality of film stripper rails 34 extending outwardly from the center portion of the turntable in angular directions, as shown. The outer end of each film stripper rail 34 terminates in a wedge member 36 provided with an upper tapered surface 38 which functions to upset upwardly an adjacent portion of the innermost winding of a tape 40 at the time that the portion of the tape is being unwound or pulled off by a sensor device 42 secured at the center of the turntable 26. The wedge members 36 function also to establish apices for the scalloped configuration shown in FIGS. 1 and 2. The film stripper rails 34 are preferably made from plastic material which offers only small resistance for the movement of the tape 40 after it is upset by the wedge member 36 and moves inward to pass through the sensor device 42.

As best shown in FIG. 2, the sensor device 42 has a circular plate 43 supporting a plurality of rollers 44 adapted to receive and guide an unwound portion of the tape and directed to a canted roller 46 which functions to direct the unwound portion of the tape in an upwardly direction as best shown in FIG. 1, wherein an unwound tape portion 40a is passed onto and over rollers 50 and 52, pinch rollers 54, and over an exit roller 56 in the direction of a program rendering apparatus, for example, a movie projector. The plate 43 also provides support for a double throw microswitch 60, having an arm 62. The function of the microswitch 60 will be described shortly.

A multi-lobed cam 64 is secured to the bottom of the turntable 26, as shown in FIG. 3. As will be described later, the multi-lobed cam 64 in conjunction with a tape pusher assembly 66, is responsible for delineating the scalloped configurations of the tape as it is wound on top of the turntable.

Referring to FIG. 2, there is shown a tape pusher assembly which comprises a pusher arm 68 having one end thereof pivotally attached to a bracket 70 which permits the pusher arm 68 to be pivoted in a vertical plane. The bracket 70 is secured to a base 72 which is pivotally supported on a pivot housing 74. The base 72 also supports an arm 76 which, at the free end thereof, supports a cam follower 78. The arm 68 and the arm 76 effectively constitute a bell crank 77. The pivot housing 74 is supported by a pivot arm 80 integrally formed with an elbow 81 pivotally supported by a pivot 82 on a bracket 84 secured to the support beam 28. A resilient member, such as a spring 86, has one end 88 secured to a channel member 90 and the other end attached to the arm 76 for the purpose of biasing the cam follower 78 against the cam 64. The pivot housing 74 serves two functions, first to pivotally support the bell crank 77 on a pivot axis 92 so that the motion of the cam follower 78 is translated to the pusher arm 68, and second to displace the pivot axis 92 in response to movement of the pivot arm 80, as will be described later.

As shown in FIG. 2, the pusher arm 68 has a major portion 94 and a minor portion 96 which is offset angularly from the major portion 94. The pusher arm 68 supports rotatably a median roller 98 and a distal roller 100. Each turntable, such as turntable 26, is rotated by a roller 102 as actuated by a disc-drive motor 104 secured by appropriate means to the support beam 28.

As a tape portion 40b leaves the lower turntable 30, it is guided over rollers 106 and 108, and then over roller 110 over rollers 112, 114, and 116. The rollers 112 and 116 are supported on a movable carriage (not shown) behind the base 118 and are slidably movable in vertical directions along support rods 120 affixed to the vertical column 22. The bottom of the carriage (not shown) is connected by a linkage 122 which extends downwardly over a pulley 124 and enters a motor controller 126 and is connected to a spring-biased control pulley 128 which actuates a variable transformer (not shown) for controlling the speed of the drive motor 104.

The rollers 52 and 108 are mounted on a speed synchronizer device 130 which possesses an internal gear arrangement (not shown) so that the rollers 52 and 108 rotate in synchronism so that the tape 40 is unwound from the inner portion of the turntable 26 at the same rate that the tape is wound on the outer portion of the turntable 26.

The plate 58 of the sensor device 42 is anchored to a spindle 132 secured to the support beam 28. A sensor arm 134 has one end pivotally connected to a pivot shaft 138 and at the other end has rollers 136 which guide the tape to the canted roller 46. If the tape passing through the sensor device enters either to the left or the right, one throw of the microswitch 60 will be actuated to send a voltage signal to a servo-motor 140 which, at the top thereof, has an axle mounted circular plate supporting a bearing mounted eccentric to the shaft engaging a slotted member 142 (FIG. 3) secured to an arm 144 integrally formed with the elbow 81 and defining a bell crank 146. With this arrangement, when one throw of the microswitch 60 is actuated, the servo-motor 140 is energized to rotate the bearing 180° in a particular direction, for example, so that the free end of the arm 144 is moved away from the support beam 28, and when the other microswitch throw is actuated, the servo-motor 140 will rotate the eccentric mounted bearing 180° in the opposite direction, causing the arm 144 to move towards the support beam 28. It will be appreciated that such movements of the bell crank 146 will cause the pivot arm 80 of the bell crank 146 to pivot around the fixed pivot 82, with the result that the pivot housing 74 will either move toward or away from the periphery of the turntable 26, resulting thereby in a deeper or shallower movement of the rollers 98 and 100 over the turntable 26. The foregoing will cause the pusher arm 68 and its associated rollers 98 and 100 to bring about a smaller outside circumference or allow the circumference to build up naturally.

The lower turntable 30, as seen in FIG. 1, is similarly constituted as the upper turntable 26. For example, the lower turntable 30 centrally supports a sensor device 42a and is associated with a tape pusher assembly 66a pivotally supported on a pivot housing 74a which is supported at one end of a pivot arm 80a of a bell crank 146a. A movable lower carriage (not shown) behind a base 118a is movable vertically and slidably along support rods 120a and supports rollers 112a and 116a which accommodate for any slack or tightness that may occur in the tape portion 40c as it is received from a projector and is guided by a roller 150 onto rollers 114a, 112a, 113a, and 116a by controlling turntable motor speed. The lower carriage (not shown) is connected by a linkage 122 which runs over a pulley 124 and terminates in the motor controller 126 on a control pulley 128a. The control wheel 128a is spring-biased so that, if the tape portion 40c breaks anywhere along its path through the lower portion of the apparatus 20, the spring-biased wheel 128a will actuate a switch (not shown) in the motor controller 126, which will instantly cut off power applied to the disc-driven motors 140 to shut down the operation of the endless loop processing apparatus 20.

Although the disclosed endless loop processing apparatus 20 has been designed principally for loading a lengthy taped program on a pair of turntables, this apparatus will also operate from the upper turntable 26 only, or from the lower turntable 30 only, when normal length taped programs are processed.

The processing or loading of a lengthy taped program will now be described.

Assuming that the lengthy taped program is recorded on six reels of tape, the upper turntable 26 would be loaded with three reels of tape, spliced together, and the lower turntable 30 would be loaded with three reels of tape spliced together. The upper and lower turntables 26 and 30, respectively, are provided with a plurality of holes 160 which are spaced around the periphery of the turntables and located inwardly a short distance from the periphery. For example, as shown in FIG. 3, the location of the holes 160 is clearly visible. Each hole 160 is adapted to receive a removable pin (not shown). For example, the upper turntable 46 is provided with six holes 160, each hole 160 being preferably adjacent one of the lobes on the cam 64. After the pins have been set up, a reel of tape is horizontally positioned on an auxiliary equipment (not shown) so that the reel can be unwound. Assuming that the upper turntable 26 is to be loaded first, the leader of the tape is wound around one of the pins. Then, the pusher arm 68 is pivoted about pivot pin 71 in an upward position so that it would not interfere with the winding of the tape on the upper turntable 26. Roller 78 is then locked away from the cam. Thereafter, the disc-drive motor 104 is energized to drive the upper turntable 26 in the direction indicated by an arrow. After the winding is completed, the pins are removed and hand pressure is applied in six places, each place between the holes 160 to urge the winding inwardly.

The second reel of tape is then placed on the auxiliary equipment, and the leading portion of the tape on the second reel is connected to the trailing end of the tape that was loaded from the first reel. Then, the pins are set up again, and the turntable is rotated to load the tape from the second reel onto the turntable. Upon completion of loading the second reel of tape, the pins are removed, and again, the loaded tape of the second reel is pushed inward between the holes 160. The same procedure is used for loading the third reel of tape. The net result if that the three reels of loaded tape present a scalloped configuration, as best viewed in FIG. 1.

The same procedure is followed for loading the remaining three reels of tape on the lower turntable 30. After the last three reels of tape are loaded, the leading portion of the tape from the fourth reel is threaded through the sensor device 42 and then passed over guide rollers 162 in an upward direction over the rollers 106 and 108, then over rollers 112 and 116 associated with the movable carriage (not shown) behind the base 118, and then upwardly over rollers 164, and then downwardly over roller 166, which directs the leading portion of the tape for splicing with the trailing end of the tape loaded from the third reel on the upper turntable 26.

It is apparent that the leading portion 40a of the first reel passing through the sensor device 42 and guided by the roller 56 is forwarded to the rendition equipment, such as a movie projector. After passing through the movie projector, the leading portion is connected to the trailing portion 40e of the tape removed from the sixth reel, so that an endless loop is achieved.

As described so far, the tape 40 is wound on its edge on top of turntables with gravity being the only force restraining the tape. As shown in FIG. 1, the inner end of the tape stored on the lower turntable 30 passes over rollers 106 and 108 associated with the synchronizer device 130. Similarly, the inner end of the tape stored on the upper turntable 26 passes over rollers 52 and 54 on the synchronizer device 130. As was previously briefly mentioned, the synchronizer device 130 is internally geared so that the rate of movement of the portions of tape stored on both turntables is equal.

As was initially indicated, each of the turntables is provided with a sensor device centrally located and provided with a microswitch to respond to the left or right tracking of the tape being unwound from the interior of the scalloped configuration. Actuation of one of the throws of the microswitch will energize a servomotor 140 which will rotate 180° to pivot the arm 144 associated with the bell crank 146, with the result that the other pivot arm 148 of the bell crank adjusts the position of the pivot housing 74 pivotally supporting the tape pusher assembly 68, causing the pushing rollers 98 and 100 to decrease the outer circumference or allow it to build up.

While certain features of this invention have been described in detail in respect to the preferred embodiment, it will, of course, be apparent that other modifications may be made within the spirit and scope of this invention, and plus the appended claims should not be necessarily limited to the description of the preferred embodiment.

What is claimed is:
1. An endless tape processing apparatus comprising:
a turntable for providing frictional gravitational support of a rolled tape so as to permit radial and circumferential movement of the tape on the turntable;

means for applying a varied undulating force at preselected points of the outer periphery of the rolled tape to produce a varied undulation size along with radial and circumferential movement of a portion of the tape on the turntable;

means for feeding tape to the outer periphery of the rolled tape on the turntable;

means for simultaneously extracting tape from the inner periphery of the rolled tape on the turntable;

a plurality of film stripper rails extending outwardly from a center portion of the turntable and angularly directed towards the periphery of the turntable, the ends of the outwardly extending strips terminating in wedge members disposed a predetermined distance from the periphery of the turntable;

said means for applying undulating force comprises:

a cam rail secured to the turntable;

a bell crank member having a pair of arms; and means for pivotally mounting said bell crank member adjacent the periphery of the turntable;

one of said bell crank arms supporting a cam follower which engages said cam rail, and the other arm of said bell crank member being provided with pushing elements and being adapted to oscillate with respect to the periphery of the turntable for engaging the outer circumference of the film thereon.

2. The apparatus according to claim 1, comprising a plurality of friction members disposed on the surface of said turntable and extending radially outwardly from the center of the turntable.

3. The apparatus according to claim 1, wherein said means for pivotally mounting said bell crank member includes adjusting means for varying the distance of said pivotal mounting means with respect to the turntable.

4. The apparatus according to claim 3, wherein said adjusting means comprises:

a sensor device mounted for rotational movement with respect to the turntable;

a servo-motor;

a linkage connecting said servo-motor with said pivotal mounting means; and sensing members on the sensing device for responding to variation in feed of the tape traversing the sensing device for energizing said servo-motor to effect movement of said pivotal mounting support means.

5. A tape processing apparatus comprising:

a plurality of turntables;

means for drivingly supporting said turntables;

means on the surface of each turntable for frictionally restricting the movement of the tape thereon during its winding on the turntable;

a sensing means associated with each turntable;

a multi-lobed cam secured to the bottom of each turntable;

means contacting said cam and responsive to relative movement of said cam for applying an undulating force to the tape adjacent the periphery of each turntable;

support means for supporting said undulating means adjacent the periphery of each turntable;

means coupling said sensing means with said support means; and means for equalizing the rate of tape unwound from one of the turntables with the rate of the tape wound on the other turntable.

6. The apparatus according to claim 5, wherein said coupling means includes actuating means responsive to communication from the sensing means for adjusting the position of said support means with respect to the periphery of the turntable, whereby said undulating means can be readjusted with respect to the turntable.

7. The apparatus according to claim 5, including tape guiding means associated with each turntable for establishing tape winding and tape unwinding paths, whereby a portion of tape stored in one turntable can be transferred to the other turntable while an equivalent portion of tape on said other turntable is transferred to said one turntable.

* * * * *